United States Patent
Ramirez

(10) Patent No.: US 7,163,353 B2
(45) Date of Patent: Jan. 16, 2007

(54) ADAPTER FOR COUPLING A PAINT MARKING STICK TO A DIGITAL COUNTER

(76) Inventor: Adalberto R. Ramirez, 8571 Glasgow Cir., Huntington Beach, CA (US) 92647

( * ) Notice: Subject to any disclaimer, the term of this patent is extended or adjusted under 35 U.S.C. 154(b) by 95 days.

(21) Appl. No.: 10/883,259

(22) Filed: Jul. 2, 2004

(65) Prior Publication Data

US 2006/0002761 A1    Jan. 5, 2006

(51) Int. Cl.
*B05B 1/26* (2006.01)
*E01C 23/16* (2006.01)
(52) U.S. Cl. ............... 404/93; 404/94; 239/150
(58) Field of Classification Search ........... 118/300, 118/305, 320; 47/1.5; 401/48; 239/150, 239/754; 33/32.1, 32.3, 35, 41.3, 41.6, 772–782; 404/93, 94

See application file for complete search history.

(56) References Cited

U.S. PATENT DOCUMENTS

| | | | | |
|---|---|---|---|---|
| 3,673,693 A * | 7/1972 | Evans, Jr. | .................. | 33/781 |
| 3,796,353 A * | 3/1974 | Smrt | .................. | 222/612 |
| 4,176,458 A * | 12/1979 | Dunn | .................. | 33/781 |
| 4,545,531 A * | 10/1985 | Williams | .................. | 239/150 |
| 4,599,968 A * | 7/1986 | Ryder et al. | .................. | 118/305 |
| 4,895,304 A * | 1/1990 | Smrt | .................. | 239/150 |
| 4,940,184 A * | 7/1990 | Smrt | .................. | 239/71 |
| 4,943,008 A * | 7/1990 | Smrt | .................. | 239/754 |
| 4,946,104 A * | 8/1990 | Smrt | .................. | 239/150 |
| 4,989,342 A * | 2/1991 | Nosek | .................. | 33/780 |
| 5,309,643 A * | 5/1994 | McCollom | .................. | 33/32.2 |
| 5,749,522 A * | 5/1998 | Smrt | .................. | 239/71 |
| 6,102,305 A * | 8/2000 | Chapman et al. | .................. | 239/150 |
| 6,250,830 B1* | 6/2001 | Clark | .................. | 401/48 |
| 6,295,757 B1* | 10/2001 | Fields, II | .................. | 47/1.5 |
| 6,390,336 B1* | 5/2002 | Orozco | .................. | 222/162 |
| 6,532,672 B1* | 3/2003 | Gottlieb | .................. | 33/124 |

\* cited by examiner

*Primary Examiner*—Raymond W Addie
(74) *Attorney, Agent, or Firm*—Morland C. Fischer

(57) ABSTRACT

An adapter by which a conventional paint marking stick that carries a can of spray paint to mark a roadway surface in need of repair is detachably connected to a conventional digital counter having at least one wheel to roll over the surface so as to measure the size thereof. The adapter includes a base with a pair of legs projecting outwardly therefrom in a first direction and a cylindrical post projecting outwardly from the base in an opposite direction. In the assembled relationship, the pair of legs of the adapter are slidably received within a hollow jacket that surrounds one end of the paint marking stick and the cylindrical post of the adapter is moved into an existing mounting collar of the digital counter. Accordingly, a workman in the field need only use a single hand to cause the paint marking stick to roll along the surface to be repaired while, at the same time, measuring the dimensions of the area and activating the can of spray paint to mark the outline of the area.

9 Claims, 3 Drawing Sheets

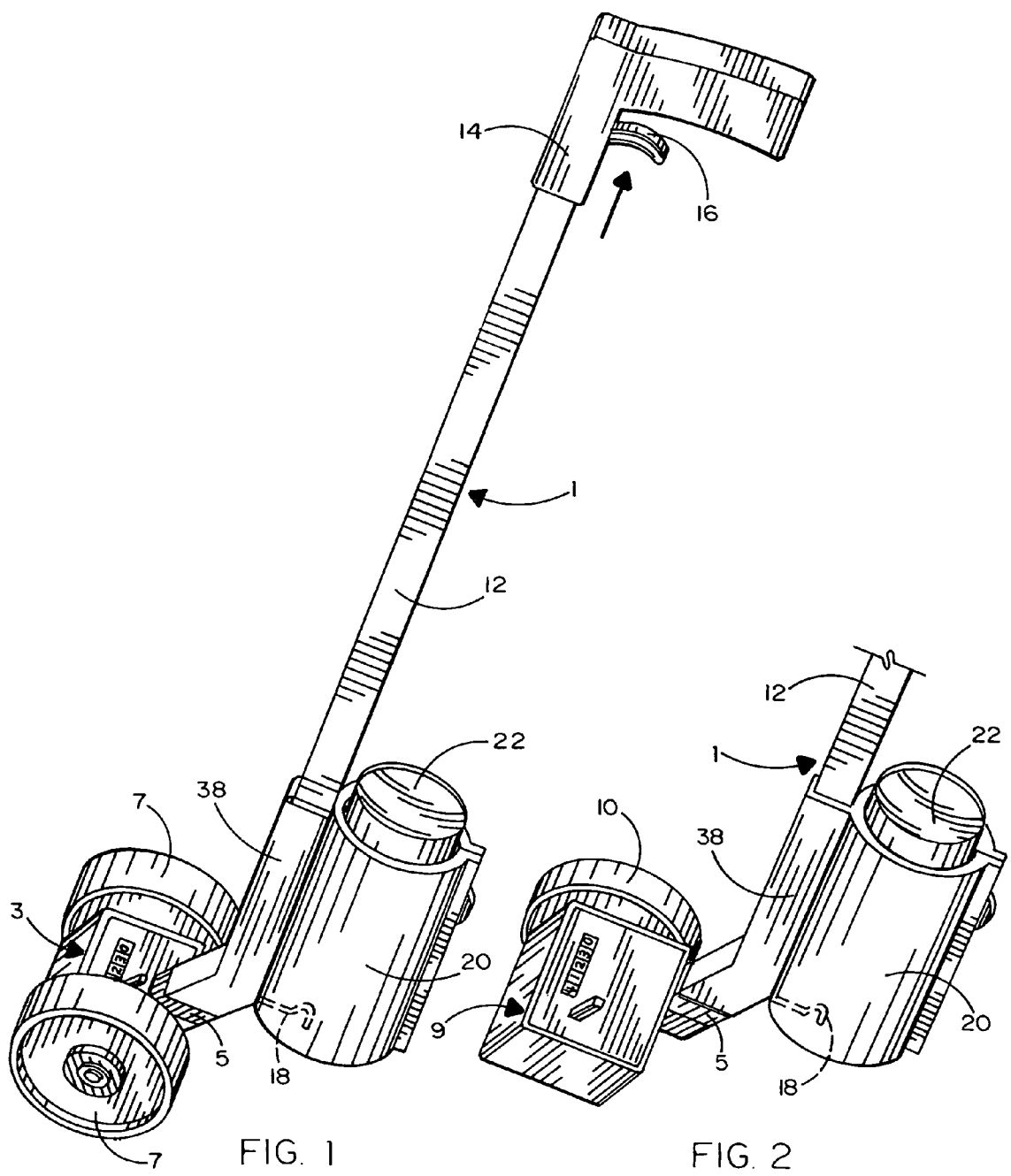

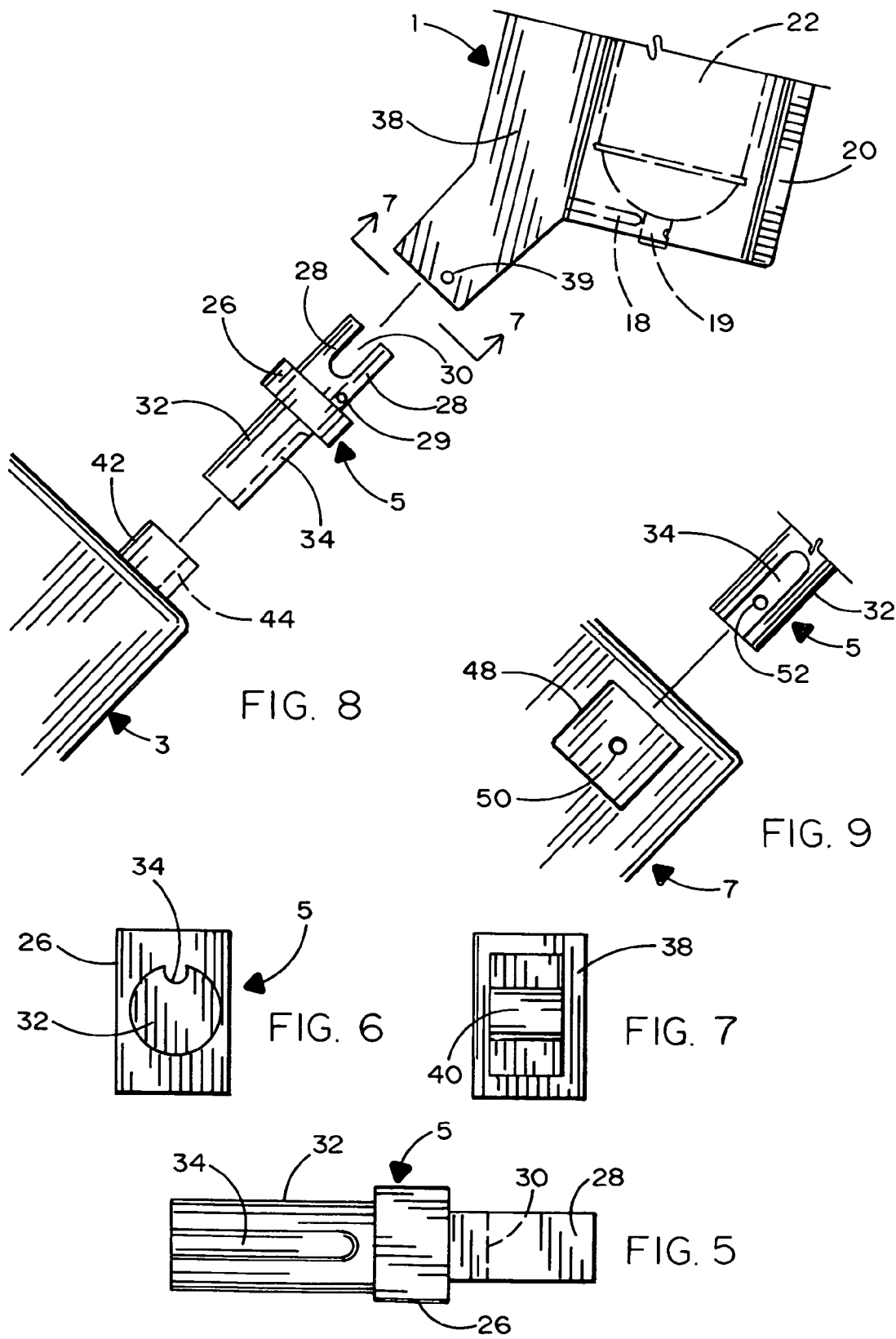

ADAPTER FOR COUPLING A PAINT MARKING STICK TO A DIGITAL COUNTER

BACKGROUND OF THE INVENTION

1. Field of the Invention

This invention relates to an adapter by which a conventional paint marking stick which carries a can of spray paint is detachably connected to a conventional digital counter having one or more wheels associated therewith. By virtue of the foregoing, a workman in the field need only use a single hand to push the paint marking stick over a surface area in need of repair so that the dimensions of the surface area can be recorded by the digital counter and the outline of the surface area marked with paint from the can of spray paint.

2. Background Art

Due to aging, wear, the weather, etc., asphalt and concrete road surfaces frequently require repair to remain in continued service for foot and automotive traffic. In order to identify the surface area to be subsequently repaired, a workman is sent into the field to measure and mark those areas to be subsequently repaired and restored. In this regard, the workman typically measures the size of the surface area in need of repair. To accomplish the foregoing, a digital counter having one or more wheels is rolled around the area so that the dimensions of the area may be noted and recorded. Next, the workman typically marks the surface area to be repaired by moving a paint marking stick around the periphery of the area. The paint marking stick carries a can of spray paint and means to activate the spray tip thereof so that the area can be outlined to enable subsequent repair.

It is inconvenient for the workman to have to use separate tools by which to move a digital counter and a can of spray paint around the work area to be measured and marked for repair. Moreover, in cases where there are many small surface areas to be first measured and then marked with paint during separate operations, the workman's job is often both tedious and time consuming. Likewise, the workman's hands are fully occupied with the separate tools necessary to complete the measuring and marking operations as well as any clipboard or notepad on which to record information concerning the areas to be repaired.

Accordingly, what would be desirable is a means by which the number of tools carried by the workman in the field to complete the measuring and marking operations can be conveniently reduced so as to make his job less tedious and more efficient.

SUMMARY OF THE INVENTION

In general terms, an adapter is disclosed by which a conventional paint marking stick which carries a can of spray paint is detachably connected to a conventional digital counter having one or more wheels associated therewith so that a workman in the field can quickly and easily measure and mark a particular surface area of a road to be subsequently repaired and returned to service. By virtue of the foregoing, the workman need only use a single hand to grasp the paint marking stick in order to cause the digital counter to roll around the surface area to be measured and to activate the can of spray paint to outline the area to be repaired.

The adapter disclosed herein includes a pair of parallel aligned legs which project outwardly in a first direction from a relatively wide base and a cylindrical post which projects outwardly in an opposite direction from the base. A slot runs longitudinally along the cylindrical post. The legs of the adapter are sized to be slidably received within a hollow jacket that surrounds the bottom of the paint marking stick. Axially aligned holes are formed in the jacket and one of the legs to receive a fastener by which the adapter is reliably retained by the paint marking stick.

In a first case, the cylindrical post of the adapter is sized to be moved into an existing mounting collar of a first digital counter. The cylindrical post is received through the mounting collar and into the body of the digital counter by which to connect the adapter to the first counter. A locating guide that extends along the mounting collar is received within the longitudinally extending slot that is formed in the cylindrical post so that the post and mounting collar are held in frictional engagement with one another. In another case, one end of the cylindrical post of the adapter is seated within the existing mounting collar of a second digital counter. Axially aligned holes are formed in the cylindrical post and the mounting collar to receive a fastener by which the adapter is reliably retained by the second digital counter.

BRIEF DESCRIPTION OF THE DRAWINGS

FIG. 1 shows an adapter according to a preferred embodiment of this invention for detachably connecting a conventional paint marking stick to a first conventional digital counter;

FIG. 2 shows my adapter for detachably connecting the paint marking stick of FIG. 1 to a second conventional digital counter;

FIG. 5 is a side view of my adapter of FIG. 4;

FIG. 6 is an end view of my adapter;

FIG. 7 shows one end of a hollow jacket that surrounds the paint marking stick taken in the direction of lines 7—7 of FIG. 8;

FIG. 8 is an exploded view showing my adapter used to detachably connect the paint marking stick to the first digital counter of FIG. 1; and FIG. 9 is an exploded view showing my adapter used to detachably connect the paint marking stick to the second digital counter of FIG. 2.

DESCRIPTION OF THE PREFERRED EMBODIMENT

Figures 3, 4:
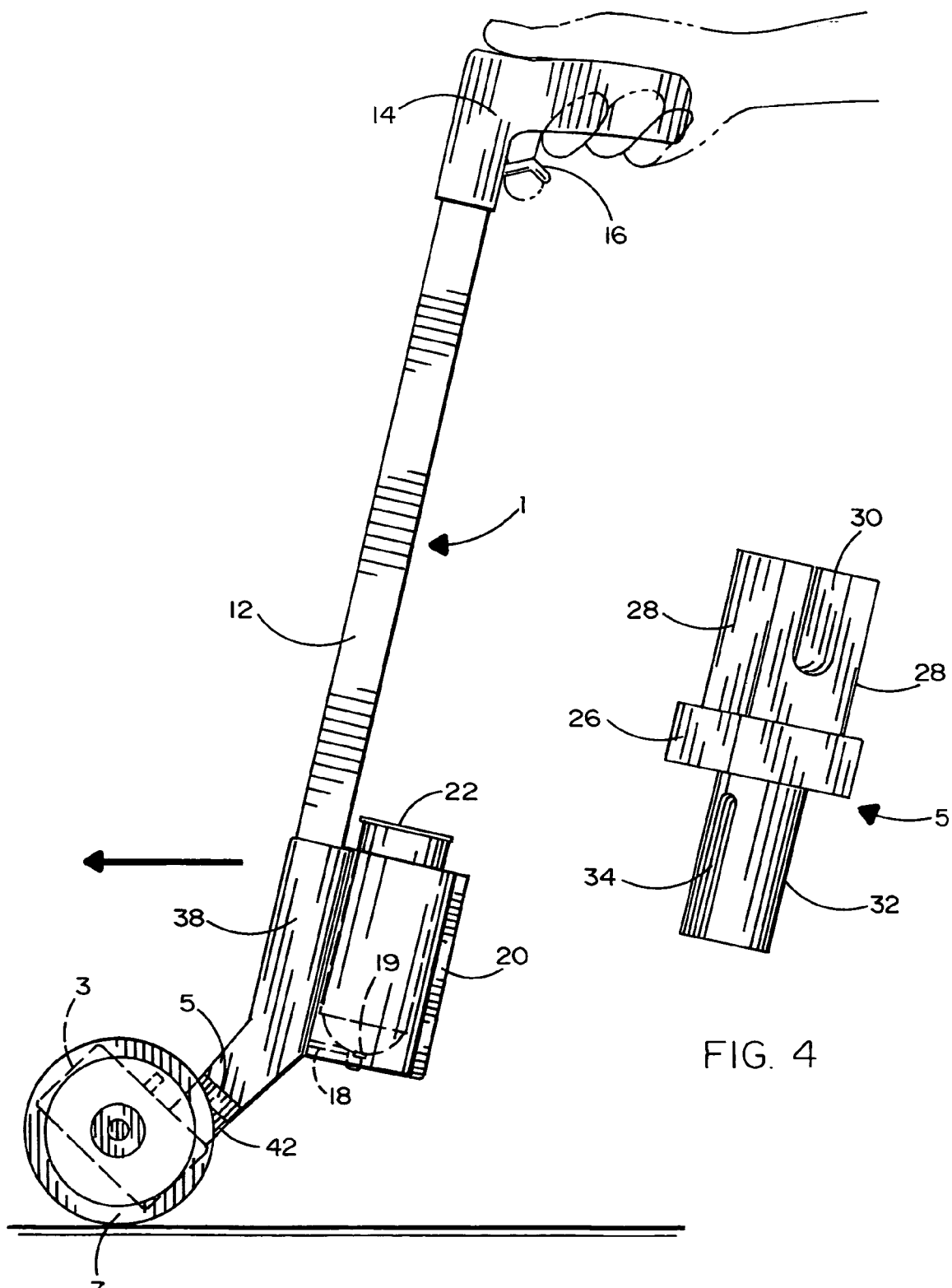
FIG. 3 shows a workman using a single hand to grasp the paint marking stick so as to enable a surface area in need of repair to be measured by the digital counter and marked with paint from a can be spray paint that is carried by the paint marking stick.
FIG. 4 is a perspective view of my adapter.

Referring initially to FIG. 1 of the drawings, there is shown a paint marking stick 1 having a first conventional digital counter 3 detachably connected thereto by means of my adapter 5 (best shown in FIGS. 4–6) according to a preferred embodiment of this invention. Because the paint marking stick 1 is generally known to a workman in the field, only a brief description thereof will be presented below. The first digital counter 3, which forms no part of my invention, includes a pair of wheels 7 that are rolled over a surface (e.g., an asphalt or concrete roadway) to be sprayed with paint in order to mark the area in need of repair. As the wheels 7 are rolled, the digital counter 3 is incremented to provide an indication of the size of the surface area in need of repair. In the example of FIG. 1, the digital counter 3 has a pair of wheels 7. A commercially available digital counter 3 having a pair of wheels 7 as is shown in FIG. 1 that is suitable to be coupled to the paint marking stick 1 by means of my adapter 5 is manufactured by White Cap Industries.

Turning briefly to FIG. 2 of the drawings, my adapter 5 is shown for detachably connecting a different digital counter 9 to the paint marking stick 1 of FIG. 1. However, in the example of FIG. 2, the digital counter 9 has a single wheel 10. A commercially available digital counter 9 having a single wheel 10 such as is shown in FIG. 2 that is suitable to be coupled to the paint marking stick 1 by means of my adapter 5 is manufactured by Rolatape Measuring Systems. It may therefore be appreciated that my adapter 5 can be used to couple a conventional paint marking stick 1 to different commercially available digital counters 3 and 9 including either a pair of wheels 7 or a single wheel 10 so as to facilitate the heretofore tedious and time consuming task of measuring, recording and spray paint marking a surface area in need of repair.

Referring concurrently now to FIGS. 1–3 of the drawings, the paint marking stick 1 has an elongated shaft 12 and a handle 14 attached at one end thereof. A trigger 16 is accessible to a workman at the handle 14. The trigger 16 is adapted to manipulate a hook 18 by way of linkage (not shown) that runs through the shaft 12. The hook 18 extends into a cylindrical sleeve 20 to lie adjacent the tip (designated 19 in FIG. 3) of a conventional spray paint can 22. The spray paint can 22 is turned upside down when it is positioned within the sleeve 20 so that the spray tip 19 points downwardly towards the surface to be marked and subsequently repaired. When a pushing force is applied to the handle 14 to cause the paint marking stick 1 to roll over the surface to be marked and repaired, the workman squeezes the trigger 16 which causes the hook 18 to be extended radially inward of the sleeve 20, whereby to press against and activate the tip 19 of spray paint can 22 so that the area in need of repair over which the paint marking stick 1 is rolled will be marked. Once the area in need of repair is completely marked with spray paint from can 22, the workman releases the trigger 16. The pressing force formerly applied by the hook 18 is now terminated so as to enable the spray tip 19 of can 22 to relax and close.

As is best shown in FIG. 3, a hollow (e.g., plastic) jacket 38 surrounds the lower end of paint marking stick 1. That is, the top of jacket 38 is affixed to the end of paint marking stick 1 that lies opposite the location of handle 14. The bottom of jacket 38 bends rearwardly from the top so as to be mated to my adapter 5 in a manner that will now be described.

Turning to FIGS. 4–6 of the drawings, details are provided of my adapter 5 by which the paint marking stick 1 which carries sleeve 20 and the spray paint can 22 therein can be detachably connected to either one of the digital counters 3 or 9 of FIGS. 1 and 2. Adapter 5 is preferably manufactured from a durable, weather resistant (e.g., aluminum) material. A relatively wide base 26 is located at the approximate midpoint of adapter 5. Projecting outwardly in a first direction from the base 26 of adapter 5 is a pair of parallel aligned legs 28. The pair of legs 28 are separated from one another by a channel 30 running therebetween. As will be described in greater detail when referring to FIG. 8, the legs 28 enable the adapter 5 to be mated to the hollow jacket 38 that surrounds the lower end of paint marking stick 1. A generally cylindrical post 32 projects outwardly and in an opposite direction from the base 26 of adapter 5. A slot 34 runs longitudinally along the post 32. As will also be described in greater detail when referring to FIG. 8, the slot 34 cooperates with the post 32 to enable the adapter 5 to be mated to the digital counter 3 shown in FIG. 1.

The means by which my adapter 5 is used to detachably connect the paint marking stick 1 to either one of the digital counters 3 or 7 of FIGS. 1 and 2 is now described while referring to FIGS. 7–9 of the drawings. As is best shown in FIG. 7, a cylindrical joint 40 extends across the bottom of the hollow jacket 38 which surrounds the shaft 12 of paint marking stick 1. In the assembled relationship, the adapter 5 is mated to the paint marking stick 1 by sliding the pair of legs 28 which project from the base 26 into the bottom of jacket 38, such that the legs 28 lie at opposite sides of and in frictional engagement with the joint 40. Therefore, it can be appreciated that the legs 28 of adapter 5 must be sized and suitably spaced from one another in order to be received within the jacket 38 and accommodate the joint 40 of jacket 38 in the channel 30 therebetween. Optional screw holes 39 and 29 are formed in each of the jacket 38 and one leg 28 of my adapter 5. When the pair of legs 28 of adapter 5 are slidably received at the bottom of jacket 38, the screw holes 39 and 29 will be axially aligned to receive an optional fastener (not shown) by which to reliably retain the adapter 5 in mating engagement with the paint marking stick 1.

The digital counter 3 shown in FIG. 1 includes an existing mounting collar 42 (best shown in FIG. 8). A locating guide 44 runs along one side of the mounting collar 42. In the assembled relationship, the adapter 5 is connected to the digital counter 3 by sliding the cylindrical post 32 which projects from the base 26 into and completely through the mounting collar 42 such that the locating guide 44 which runs along a side of the mounting collar 42 is received within the longitudinally extending slot 34 that is formed in the cylindrical post 32 of adapter 5. Moving the post 32 through the mounting collar 42 and into the body of digital counter 3 enables the adapter 5 to be retained in mating engagement with the digital counter 3. In this case, the wide base 26 of adapter 5 is held so as to lie flush against the jacket 38 of paint marking stick 1 and the collar 42 of counter 3.

The digital counter 7 shown in FIG. 2 also includes an existing mounting collar 48 (best shown in FIG. 9). A hole 50 is formed through a side of collar 48. In the assembled relationship, the adapter 5 is connected to the digital counter 7 by seating one end of the cylindrical post 32 of adapter 5 within the mounting collar 48. An optional screw hole 52 is formed in the cylindrical post 32, such as at the lower end of the longitudinally extending slot 34. The position of the screw hole 52 is selected so that when the end of post 32 is seated within the mounting collar 48, the holes 50 and 52 through the collar 48 and post 32 will be axially aligned to receive a fastener (not shown) by which the adapter 5 is reliably retained in mating engagement with the digital counter 7.

By virtue of my versatile adapter 5 herein disclosed, the paint marking stick 1 can now be easily and conveniently coupled to either one of the commercially available digital counters 3 or 7 so that a workman need only use a single hand by which to grasp handle 14 and manipulate trigger 16 to cause the paint marking stick 1 to roll along the surface area to be repaired while, at the same time, measuring the dimensions of the area and activating the tip of the can of spray paint 22 that is carried within sleeve 20 so as to mark the outline of the area.

I claim:

1. For connecting a paint marking stick that carries a can of spray paint to mark a surface in need of repair to a counter having at least one wheel to roll over the surface in need of repair in order to measure the size thereof, the improvement comprising an adapter having first and second ends and a base located therebetween, said first end including a pair of spaced, parallel aligned legs to be slidably received by the paint marking stick and said second end including a post to be received by the counter for mating said adapter to the counter, said pair of legs and said post projecting outwardly and in opposite directions relative to one another from said base.

2. The improvement recited in claim 1, including a hole formed in at least one of said pair of legs of said adapter to receive a fastener therein by which to retain said pair of legs within the paint marking stick.

3. The improvement recited in claim 1, wherein said base is located between the paint marking stick and the counter when the pair of legs of said adapter are received by the paint marking stick and the post of said adapter is received by the counter.

4. The improvement recited in claim 1, wherein the counter to be connected to the paint marking stick includes a mounting collar, the post of said adapter being moved into the mounting collar of the counter for mating said adapter to the counter.

5. The improvement recited in claim 4, wherein the mounting collar of the counter has a locating guide extending therealong and the post of said adapter has a slot formed therein, the locating guide of the mounting collar being received within the slot of said post when said post is moved into the mounting collar of the counter.

6. The improvement recited in claim 4, wherein the post of said adapter has a hole formed therein within which to receive a fastener in order to retain said post within the mounting collar of the counter.

7. For connecting a paint marking stick that carries a can of spray paint to mark a surface in need of repair to a counter having a mounting collar and at least one wheel to roll over the surface in need of repair in order to measure the size thereof, the improvement comprising an adapter having first and second ends, said first end being mated to the paint marking stick and said second end including a post for receipt inwardly of said mounting collar for mating said adapter to the counter, said post having a slot formed therein and said mounting collar having a locating guide extending therealong, said locating guide being received within said slot when said post is received inwardly of said mounting collar.

8. The improvement recited in claim 7, further comprising a fastener extending through each of said mounting collar and said post in order to retain said post within said mounting collar, whereby said adapter is detachably connected to the counter.

9. In combination:
a marking stick that carries a marking material to mark a surface in need of repair, said marking stick having a hollow area formed therein;
a counter having a mounting collar, said counter responsive to the distance traveled by said marking stick to mark the surface in need of repair;
a wheel coupled to said counter, said wheel rolling over the surface to be marked to measure the size thereof; and
an adapter for connecting said marking stick to said counter, said adapter having a leg projecting from a first end thereof and a post projecting from an opposite end, said leg and said post extending in opposite directions to be slidably and removably received inside the hollow area of said marking stick and within the mounting collar of the counter, respectively.

* * * * *